United States Patent [19]

Browning et al.

[11] 3,709,819

[45] Jan. 9, 1973

[54] OIL PHASE DRILLING FLUID ADDITIVE, COMPOSITION AND PROCESS

[75] Inventors: William C. Browning, Houston, Tex., Billy G. Chesser, Houston, Tex.; Jerry L. Wood, Cypress, Tex.

[73] Assignee: Milchem Incorporated, Houston, Tex.

[22] Filed: May 14, 1971

[21] Appl. No.: 143,631

Related U.S. Application Data

[63] Continuation-in-part of Ser. No. 857,384, Sept. 12, 1969, abandoned.

[52] U.S. Cl. ..............................252/8.5 P, 252/8.5 M
[51] Int. Cl. ..........................C10m 1/28, C10m 1/14
[58] Field of Search ..252/8.5 P, 8.5 M, 8.55 R, 49.3; 260/86.7

[56] References Cited

UNITED STATES PATENTS

| | | |
|---|---|---|
| 2,650,905 | 9/1953 | Fordyce et al.........................252/8.5 |
| 2,743,233 | 9/1958 | Fisher....................................252/8.5 |
| 2,876,197 | 3/1959 | Watkins................................252/8.5 |
| 2,851,448 | 9/1958 | Slocumbe et al..............260/86.7 X |
| 2,989,517 | 6/1961 | Hanson et al..................260/86.7 X |
| 3,057,797 | 10/1962 | Anderson et al.....................252/8.5 |
| 3,590,005 | 6/1961 | Foley et al............................252/308 |

*Primary Examiner*—Herbert B. Guynn
*Attorney*—Bertram H. Mann, Frank B. Pugsley, James G. Ulmer, Delmar L. Sroufe and Larry B. Feldcamp

[57] ABSTRACT

This invention relates to an oil phase drilling fluid composition, additive, and process which is effective at high temperatures and pressures and which consists essentially of (1) a vinyl toluene-acrylate copolymer resin which is obtained by reacting (a) vinyl toluene, with (b) an acrylate moiety, selected from the class containing of methyl, ethyl, 2-ethyl-hexyl, butyl and dodecyl acrylates and methacrylates, (2) a water-in-oil emulsion and (3) asphalt particles.

6 Claims, No Drawings

OIL PHASE DRILLING FLUID ADDITIVE, COMPOSITION AND PROCESS

CROSS REFERENCE TO RELATED APPLICATIONS

The present application is a continuation-in-part application of our copending application Ser. No. 857,384, filed Sept. 12, 1969, now abandoned.

BACKGROUND OF THE INVENTION

1. Field of the Invention

It is generally agreed among those skilled in the art that a rotary system is the most acceptable form of drilling oil and gas wells. This system depends upon the rotation of a column of drill pipe to the bottom of which is attached a multi-pronged drilling bit. The bit cuts into the earth causing the cuttings to accumulate as drilling continues. As a result, a drilling fluid must be used to carry these cuttings to the surface for removal, thus allowing the bit to continue functioning and the bottom hole to be kept clean and free of cuttings at all times. Drilling systems other than the rotary system are sometimes employed in drilling operations. Nevertheless, these systems still require a drilling fluid to remove borehole cuttings and to otherwise perform functions related to drilling fluids.

Oil-producing formations are generally porous layers having varying degrees of permeability to the flow of fluids such as oil, water, or gas. Consequently, the rate of oil production from an oil well is largely determined by the rate of flow of oil through these permeable formations which in turn is dependent upon the porosity or permeability of the sand or stone present. In drilling through such a porous layer, it is desirable to employ a drilling mud having such characteristics that excessive amounts of liquids or solids are prevented from penetrating the porous formation. The ability of a drilling mud to prevent excessive formation fluid penetration is called filtration control.

2. Description of the Prior Art

Materials that have been used in the past to control filtration rates of oil phase drilling fluids by plugging, producing cakes, or other similar methods, have included asphalt, blown asphalt, calcium carbonate, heavy metal rosinates, lignite, and mixtures comprising lignosulfonate and kaolin. These materials each have certain limitations that make it difficult to maintain control of filtration rates at both low and high temperatures and pressures. For example, blown asphalt, when utilized alone and without the addition of other components for filtration control, can only be used in a narrow cut of oil. It is not possible to satisfactorily use this material alone in drilling operations which will encounter both high and low temperatures before drilling is completed.

The soap class of materials such as calcium stearate soaps and heavy metal rosinates are satisfactory at low and moderate temperatures but go into an undesirable solution at higher temperatures. Their use is generally limited to temperatures of less than 300°F.

Lignite and lignosulfonate and kaolin additives are inflexible and hard. This feature will provide filtration control under non-critical conditions. However, where extremely close control of filtration is required when drilling through highly sensitive formations, a better seal of the formation pores must be provided.

Water soluble or colloidally dispersible hydrocarbon substituted styrenes, such as alpha methyl styrene, para methyl styrene, 2-4 dimethyl styrene and the like, have been copolymerized with acrylic and methacrylic derivatives for use in drilling fluids. For example, Oldham et al. U.S. Pat. No. 2,718,497, teaches the use of these relatively high molecular weight polymers to control water loss characteristics of aqueous muds and clay dispersions. Fordyce et al. U.S. Pat. No. 2,650,905, teaches the use of water soluble sulfonated polystyrene derivatives for filtration control in water base drilling fluids. Oil soluble sulfonated polystyrene derivatives are taught by Fordyce, by modification, by alkylation, or through neutralization of the polystyrene sulfonic acids with amines and tertiary amines having a long chain aliphatic substituent on the amino nitrogen.

In all of the prior art uses of polymers and copolymers for filter loss control, it has been the object of the art to provide a dissolved large molecule or a colloidally dispersed molecule in the drilling fluid to alter the fluid loss characteristics of the fluid. It is the discovery of the present invention that a novel improved filtration control agent may be provided by utilizing a drilling fluid consisting essentially of (1) a vinyl toluene-acrylate copolymer resin having about 1.65-to-1.00 weight ratio of acrylate to vinyl toluene, (2) a water-in-oil emulsion and (3) asphalt particles. This filtration control agent has the property of absorbing oil with resultant swelling. When this drilling fluid is used in the well bore, the swollen resin material in conjunction with the asphalt particles produces a filter cake along the borehole to maintain effective filtration control at high temperatures.

It is an object of this invention to provide a material that will form a soft deformable filtration cake-producing agent that will swell when dispersed in a water-in-oil emulsion.

It is also an object of this invention to provide a filter cake which is substantially unaffected by high borehole temperatures.

It is a further object of this invention to provide a filter cake which is effective at both high temperatures and low temperatures.

It is still a further object of this invention to provide a filtration control agent which will not materially affect the viscosity of the utilized drilling fluid system.

Other objects and advantages will be realized and appreciated by those skilled in the art from the following description, examples and claims.

SUMMARY OF THE INVENTION

The present invention provides a filter cake-producing substance which is effective at high temperatures through utilization of a vinyl toluene-acrylate copolymer resin and asphalt particles in a water-in-oil emulsion in such a manner so that the product produced readily absorbs oil and will swell to many times the original size of the resin and asphalt particles. Although not fully understood, we have found that satisfactory oil absorption and swelling of the particles results when the acrylate-to-vinyl toluene ratio is at least about 1.65-to-1.0 by weight. By the utilization of asphalt, filtration control can be greatly enhanced at elevated borehole temperatures above 450°F.

DESCRIPTION OF THE PREFERRED EMBODIMENTS

An important characteristic of a drilling fluid is its ability to form a thin impervious cake on the walls or face of the borehole to seal this surface against fluid flow therethrough. A measure of the ability of a drilling fluid to form such a thin impervious layer may be obtained by means of a simple filtration test in which the mud-cake is formed and pressed against the membrane or filter which is permeable to oil and water. We have found that the filtration control composition of the present invention will produce a filter cake which still retains its effectiveness at temperatures as high as 500°F. Moreover, a drilling fluid containing the filtration control agent of the present invention is not affected when weighted with a high specific gravity material such as barite.

The filtration control agent consists essentially of a vinyl toluene-acrylate copolymer resin which is mixed with asphalt in a water-in-oil emulsion. The vinyl tolene-acrylate copolymer resin is obtained by reacting an aromatic vinyl monomer with an acrylate moiety, such as methyl, ethyl, 2-ethyl-hexyl, butyl, and dodecyl acrylates, or methacrylates in accord with well-known polymerization techniques to produce a copolymer of at least about 200,000 molecular weight. It has been found that the vinyl toluene-acrylate copolymer resin can be prepared in such a manner as to provide a product with a high capacity for oil absorption. This can be achieved by utilizing a ratio of acrylate-to-vinyl toluene of at least about 1.65-to-1.00, by weight, which is the preferred ratio. When the product contains a lesser amount of acrylate, the desired swelling does not occur in the water-in-oil emulsion.

Asphalts range from highly viscous liquids to essentially solid materials and include such materials as natural asphalts, petroleum asphalts, sulfurized asphalts, the solid petroleum residues or pitches obtained in the vacuum reduction of crude oils, asphalt extract fractions obtained in the solvent refining of residual petroleum oil fractions, asphaltites such as gilsonite, manjak or glance pitch, grahamite, blown asphalt, and the like. Any of these materials can be utilized in the practice of the present invention. We prefer to use commonly produced and available air-blown asphalt. This substance is produced by heating a suitable petroleum stock with the simultaneous incorporation of air, so that oxygen is taken up by the asphalt and its softening point is raised to a relatively high value. We prefer an air-blown asphalt having a softening point of about 250°F, as determined by applicable ASTM (American Society for Testing and Materials) standards. However, a wide range of air-blown asphalts may be utilized in accordance with the teachings of the present invention. Blown asphalts having softening points within the general range of 220°F to 320°F may be utilized. The particle size of the selected asphalt component should be at least small enough to pass through a U.S. No. 60 standard mesh screen. Preferably, about 95 percent of the particles will pass through a U.S. No. 80 standard mesh screen.

A suspended component in the form of a weighting material or a weighting agent is generally added to the drilling fluid in order to add weight to the drilling fluid emulsion to overcome any formation pressures encountered during drilling operations. Weighting materials commonly used are crushed oyster shells, barites, hematite, magnetite, and the like. The preferred weighting materials are those which have a greater tendency to be wetted by oil than by water.

Other materials known to those skilled in the art may be utilized from time to time when needed. These materials may serve as suspending agents, wetting agents, and the like. Their use is not material to the practice of the present invention.

When added to the vinyl toluene-acrylate copolymer resin, asphalt particles have been found to further enhance filtration control by providing a more effective filter cake in the borehole. In addition, asphalt will not alter high temperature or high pressure effectiveness of the filter cake and will, in fact, enhance high temperature effectiveness. We have found that satisfactory asphalt-to-resin ratios as high as 8-to-1 by weight and as low as 1-to-1 by weight will provide quite satisfactory filtration control under normal drilling conditions and environments. The ratio of asphalt-to-resin used will vary and will depend on the selected drilling operation and the various borehole conditions. Generally speaking, about a 4-to-1 ratio is preferred.

The filtration agent will soften and swell to a controlled degree when placed in an oil product such as a crude oil, a topped straight run fraction from any crude, a thermally cracked residuum obtained from any crude, diesel fuel, and/or other hydrocarbon fractions. When dispersed in the oil medium, this product will be in a soft and deformable physical state so that a liquid rivet can be formed at the entrance to a space or well bore opening to give maximum shut-off and filtration control. The ability of the cake-producing substance to swell by absorbing solutions is of utmost importance and it is this characteristic which permits the filter cake to effectively control filtration loss.

The filtration control agent of the present invention can be used in drilling fluids containing any oil or oil by-product that is currently known to those skilled in the drilling fluid art. We have found that kerosene, diesel oil, or any form of crude or refined oil can be utilized. The exact amount of oil which can be used is not critical and will depend on the specific needs of the selected drilling operation. The preferred range of oil in the entire drilling fluid system used should preferably be between about 60 and 80 parts by volume. By "oil phase drilling fluid" we mean a drilling fluid comprising a water-in-oil emulsion where fresh water, salt water, sea water or brines or mixtures thereof is the dispersed phase and diesel, crude, or some other hydrocarbon is the continuous phase. The formation of the drilling fluid emulsion may be accomplished by the use of any techniques and any emulsifying agents known to the art. Suitable emulsifying agents for the production of water-in-oil emulsions include polyoxyethylene sorbitol beeswax derivatives, propylene glycol fatty acid esters, propylene glycol monostearate, sorbitan sesquioleate, polyoxyethylene sorbitol 4.5 oleate, glycerol monostearate, sorbitan monooleate, propylene glycol monolaurate, sorbitan monostearate, diethylene glycol monooleate, diethylene glycol fatty acid esters, diethylene glycol monostearate, diethylene glycol monolaurate, sorbitan monopalmitate, polyoxyethylene dioleate, tetraethylene glycol monostearate, tetraethylene glycol monooleate, and the like. While any suitable type of emulsifying agent may be employed, it is preferred to employ the amine emulsifier described and utilized in Example I. The particular emulsifying agents used, as well as other additives such as suspending agents, wetting agents and the like, are not material to this invention.

It is important to note that the addition of a high amount of oil will result in a thin fluid while the addition of a low amount of oil will produce a fluid of extremely high viscosity. The water-to-oil ratio is economically important because water is less costly. However, increased quantities of water will necessarily affect the amount of barite or other weighting agent that can be later added to the drilling fluid system.

Generally speaking, any type of water can be used as the water phase of the drilling fluid to obtain the filter cake of the present invention. We have found that seawater and fresh water, as well as brackish and saturated brines are equally effective and compatible with the filtration control agent of the present invention. Although an oil phase drilling fluid containing high levels of water can be used with the filtration control agent, we prefer to utilize a drilling fluid containing between about 20 and 40 parts water by volume to the entire drilling fluid content. Use of the preferred range of water will result in a fluid with ideal viscosity characteristics. However, the exact amount of water desired will depend upon the actual requirements of the fluid for the selected drilling operation.

Upon addition of the oil, the vinyl toluene-acrylate copolymer resin and asphalt particles will absorb the oil molecules and swell. The swollen resin and asphalt particles will form a filter cake along the borehole of the drilling well to prevent loss of fluid. The filtration control agent first slowly imbibes the oil to form a swollen gel. This gel will not disintegrate into a solution upon the application of agitation because of strong hydrogen bonding.

The filtration control agent may be used in the drilling of a well by circulating during drilling an oil phase drilling fluid containing the filtration control agent in any amount necessary to obtain the desired filtration control level. Under most drilling conditions, levels between about 1.5 ppb (pounds per 42 gallon barrel) and 20 ppb will be sufficient to form a cake to control filtration loss. A treatment of 10 ppb of a composition of a 4-to-1 asphalt-to-resin ratio has been found to be satisfactory to obtain good filtration control at temperatures of about 530°F and pressures exceeding 500 psi.

A measure of the ability of a drilling fluid to form a thin impervious compressible filter cake may be determined by utilization of a simple filtration test in which the filter cake is formed and pressed against the membrane or filter which is permeable to oil and water. A standardized procedure for determining the filtration rate is described in "API Recommended Practice RP13B Standard Procedure for Testing Drilling Fluids," second edition (April, 1969). The test which is preferred is the high temperature test which determines fluid loss at 300°F and 500 psi differential pressure.

Under these conditions, when using 10 ppb of the filtration control agent in a 4:1 asphalt-to-resin ratio, with an oil-water ratio of 85-to-15, a filtrate of only 0.2 ml was obtained. However, our filtration control agent has been found to be effective at even higher temperatures and, for this reason, we have utilized the API high temperature test procedures but have increased test temperatures to demonstrate the novel and unique ability of the filter cake to effectively function at these higher temperatures. We have found that filtrate loss can be controlled under these critical test conditions to less than about 1.9 ml at 530°F/500 psi when the filtration control agent of the present invention is used in a 10 ppb treatment.

The invention is further described and illustrated by the following examples:

EXAMPLE I

A copolymer resin having a vinyl toluene-to-acrylate ratio of 1.65-to-1.0 is mixed with blown asphalt having a softening point of 250°F and ground sufficiently to provide particles which will pass through a U.S. No. 60 standard mesh screen. The asphalt is mixed with the resin in a 4-to-1 asphalt-to-resin ratio. This filtration control agent was added to an oil phase drilling fluid having the following components per barrel:

| | |
|---|---|
| Diesel Oil | 178.0 ml |
| Saponified fatty acid emulsifier, liquid | 8.3 ml |
| Amine emulsifier, dry | 7.5 g |
| Lime | 5.0 g |
| Filtration control agent | 10.0 g |
| Suspending agent | 2.5 g |
| CaCl$_2$ water (250,000) ppm) | 43.0 ml |
| Wetting agent | 2.5 ml |
| Barite | 640.0 g |

The suspending agent was an amine-treated hectorite clay. In lieu of the amine-treated hectorite clay, any suitable suspending clay known to those skilled in the art may be used in the practice of the present invention. The wetting agent was a major amount of an amine dodecyl benzene sulfonate with a nonyl phenol condensate blended in diesel oil. Other suitable oil wetting agents can also be used in place of the above wetting agent. The amine emulsifier used above is further disclosed in Foley et al. U.S. Pat. application Ser. No. 710,763, filed Mar. 6, 1968, now Pat. No. 3,590,005. In summary, the Foley et al. application states that "(i)n accordance with the present invention, certain emulsifier compositions have been evolved comprising admixtures of (a) condensation reaction products of certain oxidized hydrocarbon waxes and amines and (b) metal salts of oxidized hydrocarbon waxes, which, it has been found, are highly effective for preparing water-in-oil emulsions which are stable at elevated temperatures and in the presence of electrolytes." The abstract of this disclosure is as follows: "Emulsifier compositions comprising admixtures of (a) between about 10% and 90% by weight of an oxidized hydrocarbon wax-amine condensation product and (b) between about 90% and 10% of a metal salt of an oxidized hydrocarbon wax, said emulsifier compositions being particularly effective for preparing water-in-oil emulsions that are stable in the presence of electrolytes and at temperatures as high as about 260°C." A representative claim of this invention is "(a)n emulsifier composition comprising an admixture of (a) between about 10% and 90% by weight of an oxidized hydrocarbon wax-amine condensation product, said oxidized hydrocarbon wax-amine condensation product being the product of the reaction of an oxidized hydrocarbon wax and a polyamine, said polyamine being a member of the class consisting of (1) a polyamine having at least one primary and at least one secondary amino group; and (2) a polyamine having two primary amino groups separated by two or three carbon atoms; and (b) between about 90% and 10% by weight of a metal salt of an oxidized hydrocarbon wax, said metal selected from at least one member of the group consisting of alkali metals, alkaline earth metals, aluminum, copper, chromium and lead." Briefly stated, a suitable emulsifier can be prepared by mixing together and heating at 150°C 335 grams of oxidized microcrystalline wax and 90 g of tetraethylene pentamine. While maintaining a temperature of about 150°C the reaction is allowed to proceed with agitation under a vacuum of about 26 mm Hg for 4 hours during which period water evolution will cease and 8.5 cc of water should be collected. The reaction batch is then allowed to cool to about 110°C and maintained at that temperature while an additional 350 g of oxidized microcrystalline wax is added while continuing to agitate the batch. 140 g of 50 percent aqueous sodium hydroxide is then slowly added with agitation to the batch of melted wax. About 10 minutes after the sodium hydroxide is completely incorporated, gelation will start to occur, and 210 g of 30 percent aqueous calcium chloride should be added while mixing the reaction mass at high speed to insure the formation of a uniform emulsion. The batch mass is then dried, cooled, and ground to powder.

After mechanical agitation, the above prepared fluid was hot rolled for 24 hours at 150°F. The sample was then tested for filter loss at a temperature of 530°F and 300 psi using an Aloxite disc (one fourth inch) as the filter medium. After 2 hours of testing the collected filtrate was only 1.9 ml. The table below further illustrates the results of this test:

Table 1

| Time (Minutes) | Filtrate (ml) |
|---|---|
| 1 | 0 |
| 5 | 0 |
| 10 | 0 |
| 15 | 0 |
| 20 | 0 |
| 25 | 0 |
| 30 | 0 |
| 45 | 0 |
| 60 | .1 |
| 75 | .6 |
| 90 | 1.1 |
| 105 | 1.6 |
| 120 | 1.9 |

EXAMPLE II

A laboratory prepared drilling fluid was prepared using the filtration control agent prepared as in Example I in the following formulation:

| Diesel Oil | 160 ml |
|---|---|
| Amine Emulsifier | 6 grams |
| Filtration Control Agent | 7.0 grams |
| Suspending Agent | 2.0 grams |
| Wetting Agent | 1.0 ml |
| Saturated CaCl$_2$ Water | 107 ml |
| Barite | 290 grams |

The sample was tested for filter loss using a Dynalloy X-5 disc as the filter medium. The filter loss at 450°F/500 psi was 8.6 ml.

It will be observed that the ml filter loss in this test was higher than those in the test described in Example I. However, in this example only 7 ppb of the filtration control agent was utilized.

The amount of the filtration control agent of this invention which will be required for effective filtration control will vary with differences in drilling fluid composition and the temperatures encountered within a particular well. Pilot tests may be conducted under the temperature conditions of a particular well with the drilling fluid used therein to determine the amount of the agent required for effective filtration control. Such tests may be conducted with different quantities of filtration control agent to determine the least amount required for any predetermined acceptable fluid loss (usually 9.0 ml loss under the API test conditions described above, but a higher or lower limit may be set if desired).

Although the invention has been described in terms of specified embodiments which are set forth in detail, it should be understood that this is by illustration only and that the invention is not necessarily limited thereto, since alternative embodiments and operating techniques will become apparent to those skilled in the art in view of the disclosure. Accordingly, modifications are contemplated which can be made without departing from the spirit of the described invention.

What we claim is:

1. A water-in-oil emulsion drilling fluid consisting essentially of water emulsified in a continuous oil base, at least about 1.5 pounds per 42 gallon barrel of (1) a vinyl toluene-acrylate copolymer resin which is obtained by reacting (a) vinyl toluene with (b) an acrylate moiety selected from the class consisting of methyl, ethyl, 2-ethyl-hexyl, butyl and dodecyl acrylates and methacrylates, the weight ratio of said acrylate to vinyl toluene being at least about 1.65-to-1, the molecular weight of said resin being at least about 200,000, and (2) asphalt particles having a softening point from between about 220°F and about 320°F, said particles being small enough to pass through a United States No. 60 standard mesh screen, the ratio of said asphalt particles to said resin being from about 1-to-1 to about 8-to-1, and an emulsifying agent.

2. The drilling fluid of claim 1 wherein the asphalt particles are air-blown asphalt.

3. The drilling fluid of claim 1 wherein the ratio of said asphalt particles to said resin is about 4-to-1.

4. In a method of drilling a well into subterranean formations in which a water-in-oil emulsion drilling fluid is circulated into the well, the steps of forming a filter cake on the wall of the well to decrease loss of fluid from the drilling fluid which comprises admixing with said drilling fluid an amount of at least about 1.5 pounds per 42 gallon barrel of (1) a vinyl toluene-acrylate copolymer resin which is obtained by reacting (a) vinyl toluene with (b) an acrylate moiety selected from the class consisting of methyl, ethyl, 2-ethyl-hexyl, butyl and dodecyl acrylates and methacrylates, the weight ratio of said acrylate-to-vinyl toluene being at least about 1.65-to-1, the molecular weight of said resin being at least 200,000, and (2) asphalt particles having a softening point from between 220°F and about 320°F, said particles being small enough to pass through a United States No. 60 standard mesh screen, the ratio of said asphalt particles to said resin being from about 1- to-1 to about 8-to-1, and circulating said drilling fluid in said well.

5. The method of claim 4 wherein the asphalt particles are air-blown asphalt.

6. The method of claim 4 wherein the ratio of said asphalt particles to said resin is about 4-to-1.

* * * * *